United States Patent
Dilluvio

(10) Patent No.: US 7,198,318 B2
(45) Date of Patent: Apr. 3, 2007

(54) RETRACTABLE ROOF STRUCTURAL SYSTEM

(75) Inventor: Christopher Dilluvio, Farmington Hills, MI (US)

(73) Assignee: ASC Incorporated, Southgate, MI (US)

( * ) Notice: Subject to any disclaimer, the term of this patent is extended or adjusted under 35 U.S.C. 154(b) by 9 days.

(21) Appl. No.: 10/807,533

(22) Filed: Mar. 23, 2004

(65) Prior Publication Data

US 2004/0222658 A1 Nov. 11, 2004

Related U.S. Application Data

(60) Provisional application No. 60/457,045, filed on Mar. 24, 2003.

(51) Int. Cl.
*B60J 7/20* (2006.01)
(52) U.S. Cl. .................. 296/107.08; 296/121; 296/128
(58) Field of Classification Search ............... 296/37.1, 296/121, 122, 128, 131, 132, 107.08
See application file for complete search history.

(56) References Cited

U.S. PATENT DOCUMENTS

| | | |
|---|---|---|
| 1,774,199 A | 8/1930 | Good |
| 1,933,623 A | 11/1933 | Gordon |
| 1,990,848 A | 2/1935 | Velo |
| 2,181,869 A | 12/1939 | Carr |
| 2,234,040 A | 3/1941 | Carr |
| 2,303,789 A | 12/1942 | Carr |
| 2,747,928 A | 5/1956 | Olivier et al. |
| 2,800,361 A | 7/1957 | Kabacka |
| 2,845,299 A | 7/1958 | Pickering |
| 3,053,567 A | 9/1962 | Geiger |
| 3,211,494 A | 10/1965 | Husko |
| 3,304,117 A | 2/1967 | Harris et al. |
| 3,338,624 A | 8/1967 | Champion |
| 3,377,099 A | 4/1968 | Podolan |
| 3,525,687 A | 8/1970 | Ross et al. |
| 3,575,464 A | 4/1971 | Himka et al. |
| 4,634,171 A | 1/1987 | McKeag |
| 4,687,247 A | 8/1987 | Muscat |
| 4,776,626 A | 10/1988 | Seyler |
| 4,828,317 A | 5/1989 | Muscat |
| 4,966,403 A | 10/1990 | Nordstrom |
| 4,973,097 A | 11/1990 | Hosan et al. |
| 5,033,789 A | 7/1991 | Hayashi et al. |

(Continued)

FOREIGN PATENT DOCUMENTS

DE 3733892 4/1989

(Continued)

OTHER PUBLICATIONS

RSportsCars.com, "Stunt Bars & Anti-Sway Bars," pp. 1-2, (believed to have been publicly used in the United States prior to Mar. 2004).

*Primary Examiner*—Jason Morrow
(74) *Attorney, Agent, or Firm*—Harness, Dickey & Pierce, P.L.C.

(57) ABSTRACT

The retractable roof structural system utilizes a structural member that is coupled to opposing quarter panel sections of the vehicle to enhance the torsional rigidity and stiffness of the vehicle. The structural member can be selectively uncoupled from the vehicle to allow the for unimpeded retraction of the retractable roof.

44 Claims, 12 Drawing Sheets

U.S. PATENT DOCUMENTS

| | | | |
|---|---|---|---|
| 5,090,764 A | 2/1992 | Kogawa et al. | |
| 5,211,718 A * | 5/1993 | Gotz et al. | 296/180.1 |
| 5,301,987 A | 4/1994 | Tokarz | |
| 5,533,777 A | 7/1996 | Kleemann et al. | |
| 5,542,735 A | 8/1996 | Furst et al. | |
| 5,551,743 A | 9/1996 | Klein et al. | |
| 5,558,389 A | 9/1996 | Rothe et al. | |
| 5,593,202 A | 1/1997 | Corder et al. | |
| 5,624,149 A | 4/1997 | Tokarz | |
| 5,678,881 A | 10/1997 | Tokarz | |
| 5,743,587 A | 4/1998 | Alexander et al. | |
| 5,746,470 A | 5/1998 | Seel et al. | |
| 5,758,923 A | 6/1998 | Kolb | |
| 5,772,275 A | 6/1998 | Tokarz | |
| 5,810,422 A | 9/1998 | Corder et al. | |
| 5,823,606 A | 10/1998 | Schenk et al. | |
| 5,904,395 A | 5/1999 | Wedin | |
| 5,921,608 A | 7/1999 | Schmitt et al. | |
| 5,944,378 A | 8/1999 | Mather et al. | |
| 5,967,590 A | 10/1999 | Beierl et al. | |
| 5,967,593 A | 10/1999 | Schuler et al. | |
| 5,975,619 A | 11/1999 | Dettling et al. | |
| 5,979,970 A | 11/1999 | Rothe et al. | |
| 6,010,178 A | 1/2000 | Hahn et al. | |
| 6,019,417 A | 2/2000 | Haberl | |
| 6,030,023 A | 2/2000 | Guillez | |
| 6,039,382 A | 3/2000 | Mather et al. | |
| 6,048,021 A | 4/2000 | Sautter, Jr. | |
| 6,053,559 A | 4/2000 | Heberl et al. | |
| 6,053,560 A | 4/2000 | Rothe | |
| 6,062,628 A | 5/2000 | Guillez | |
| 6,070,929 A | 6/2000 | Barkley | |
| 6,092,335 A | 7/2000 | Queveau et al. | |
| 6,142,555 A | 11/2000 | Huber | |
| 6,145,909 A | 11/2000 | Staley et al. | |
| 6,145,915 A | 11/2000 | Queveau et al. | |
| 6,164,713 A | 12/2000 | Graf et al. | |
| 6,168,224 B1 | 1/2001 | Henn et al. | |
| 6,176,528 B1 * | 1/2001 | Taga | 292/341.16 |
| 6,186,577 B1 | 2/2001 | Guckel et al. | |
| 6,193,300 B1 | 2/2001 | Nakatomi et al. | |
| 6,217,104 B1 | 4/2001 | Neubrand | |
| 6,217,105 B1 | 4/2001 | Hollerbach | |
| 6,250,707 B1 | 6/2001 | Dintner et al. | |
| 6,254,165 B1 | 7/2001 | Neubrand | |
| 6,270,144 B1 | 8/2001 | Schenk | |
| 6,283,530 B1 | 9/2001 | Hollerbach | |
| 6,288,511 B2 | 9/2001 | Porter et al. | |
| 6,293,605 B2 | 9/2001 | Neubrand | |
| 6,299,234 B1 | 10/2001 | Seel et al. | |
| 6,315,349 B1 | 11/2001 | Kinnanen | |
| 6,318,792 B1 | 11/2001 | Neubrand et al. | |
| 6,325,445 B1 | 12/2001 | Schenk | |
| 6,352,298 B1 | 3/2002 | Hayashi et al. | |
| 6,357,815 B1 | 3/2002 | Queveau et al. | |
| 6,361,097 B1 | 3/2002 | Lechkun | |
| 6,386,615 B2 | 5/2002 | Neubrand et al. | |
| 6,390,532 B1 | 5/2002 | Mac Farland | |
| 6,419,294 B2 | 7/2002 | Neubrand | |
| 6,419,308 B1 | 7/2002 | Corder et al. | |
| 6,425,621 B2 | 7/2002 | Miklosi et al. | |
| 6,425,622 B2 | 7/2002 | Eberle | |
| 6,508,502 B2 | 1/2003 | Willard | |
| 6,572,175 B2 | 6/2003 | Schutt et al. | |
| 6,604,775 B2 | 8/2003 | Obendiek | |
| 6,764,126 B2 * | 7/2004 | Mentink et al. | 296/107.08 |
| 6,799,788 B2 * | 10/2004 | Plesternings | 296/107.08 |
| 6,824,194 B2 * | 11/2004 | Weissmueller et al. | 296/107.08 |
| 6,832,807 B2 * | 12/2004 | Tezuka | 296/128 |
| 6,857,686 B2 * | 2/2005 | Willard | 296/107.08 |
| 2001/0004156 A1 | 6/2001 | Neubrand et al. | |
| 2001/0005086 A1 | 6/2001 | Neubrand | |
| 2001/0005089 A1 | 6/2001 | Neubrand | |
| 2001/0019213 A1 | 9/2001 | Eberle | |
| 2001/0020793 A1 | 9/2001 | Eberle | |
| 2001/0040386 A1 | 11/2001 | Miklosi et al. | |
| 2001/0042991 A1 | 11/2001 | Schuler et al. | |
| 2001/0048231 A1 | 12/2001 | Ellermann et al. | |
| 2002/0011739 A1 | 1/2002 | Nicastri | |
| 2002/0014782 A1 | 2/2002 | Neubrand | |
| 2002/0024231 A1 | 2/2002 | Schutt | |
| 2002/0036413 A1 | 3/2002 | Neubrand et al. | |
| 2002/0041109 A1 | 4/2002 | Wagner et al. | |
| 2002/0093218 A1 | 7/2002 | Weissmueller et al. | |
| 2002/0105205 A1 | 8/2002 | Willard | |
| 2003/0020300 A1 | 1/2003 | Zipperle | |
| 2003/0025350 A1 * | 2/2003 | Sande | 296/107.08 |
| 2003/0042751 A1 * | 3/2003 | Antreich | 296/107.17 |
| 2003/0071479 A1 | 4/2003 | Schaller et al. | |
| 2004/0051341 A1 | 3/2004 | Willard | |
| 2004/0075294 A1 * | 4/2004 | Antreich | 296/136.06 |
| 2005/0046221 A1 * | 3/2005 | Guillez et al. | 296/107.08 |

FOREIGN PATENT DOCUMENTS

| | | |
|---|---|---|
| DE | 3743502 | 7/1989 |
| DE | 4136895 C1 | 11/1992 |
| DE | 4445580 C1 | 12/1995 |
| DE | 4445941 C1 | 3/1996 |
| DE | 4445944 C1 | 4/1996 |
| DE | 4446483 A1 | 6/1996 |
| DE | 4445920 A1 | 7/1996 |
| DE | 19514022 C1 | 9/1996 |
| JP | 61-247515 | 11/1986 |
| JP | 1-111525 | 4/1989 |
| WO | WO 2003/086794 | 10/2003 |

\* cited by examiner

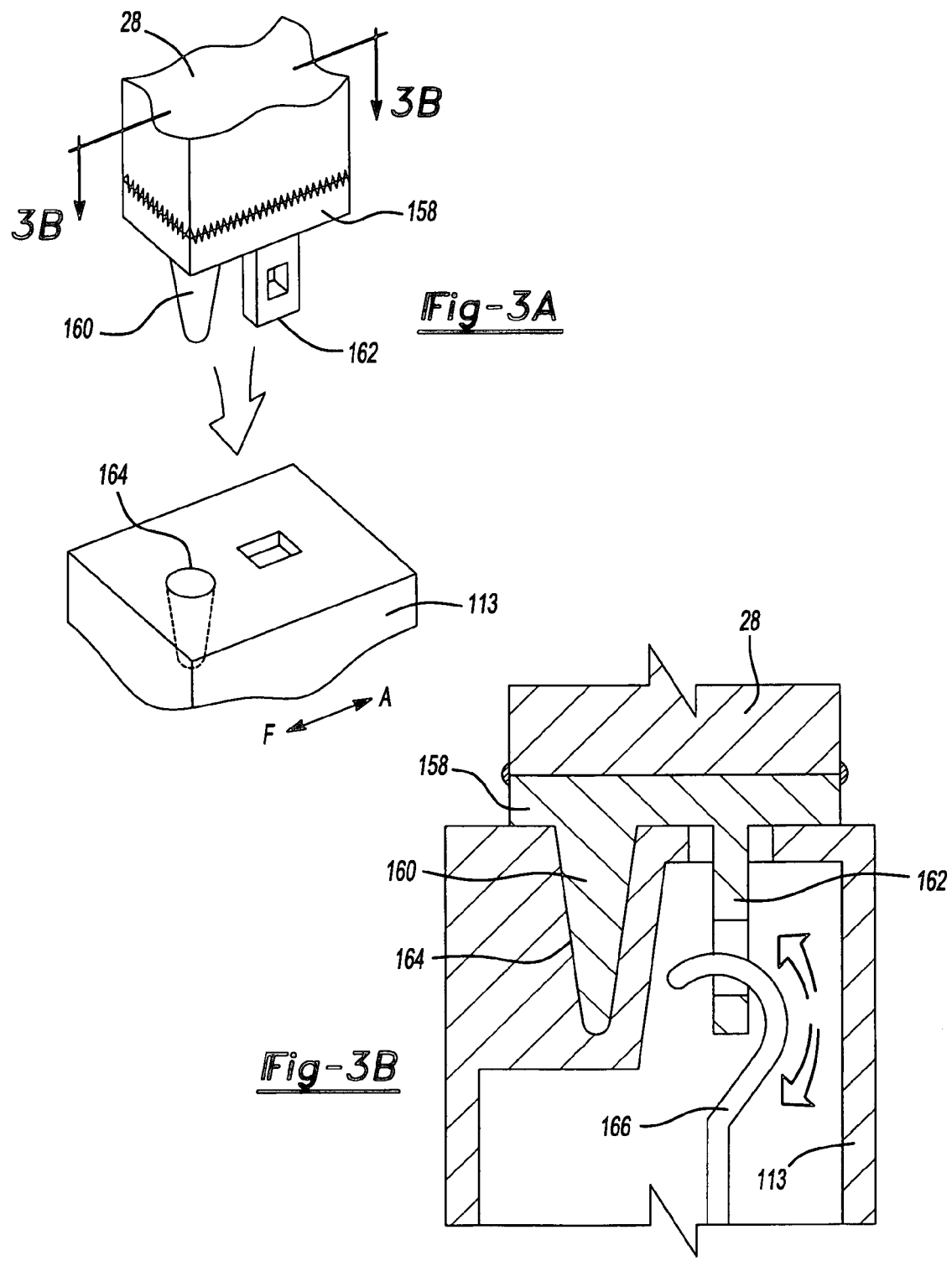

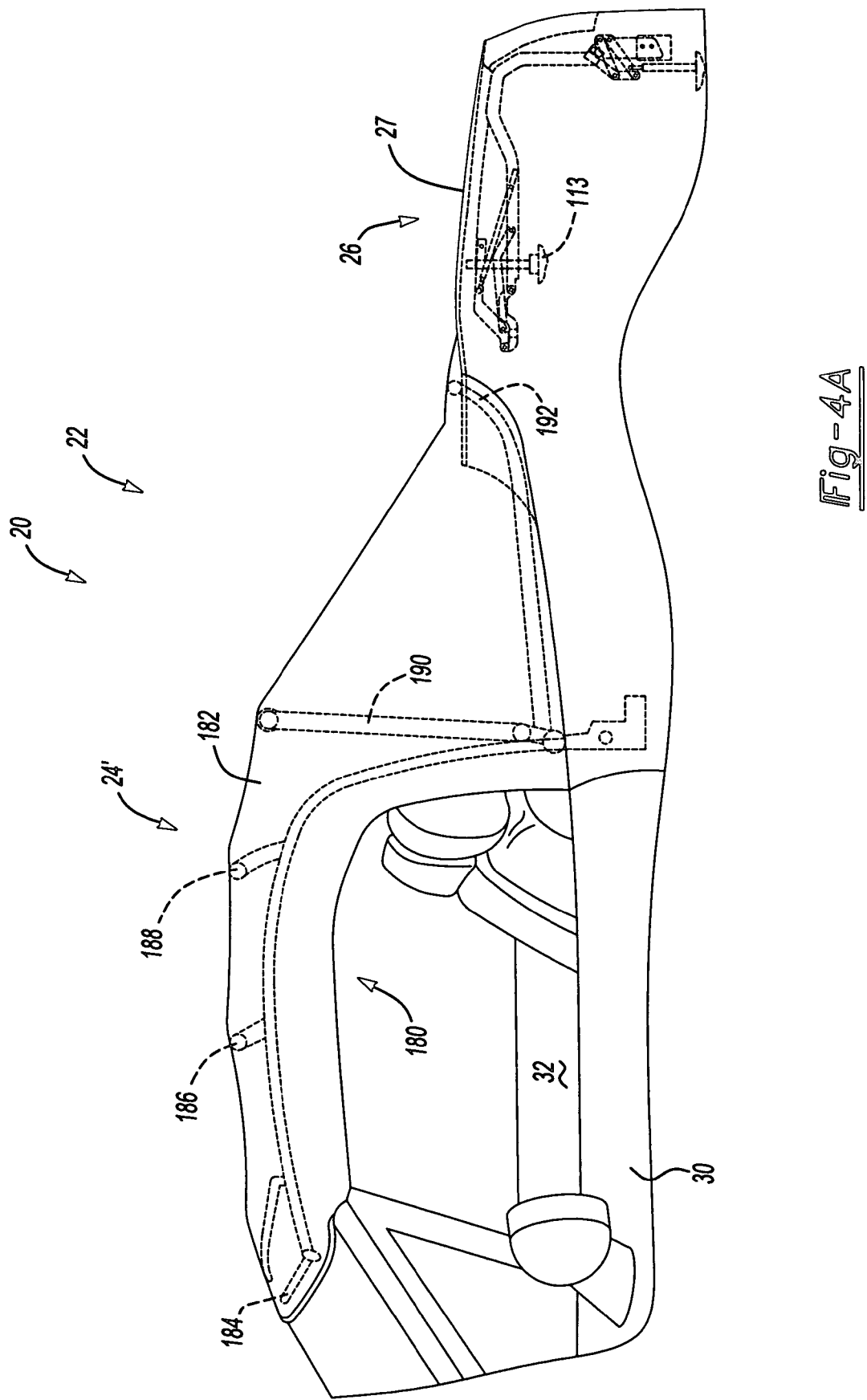

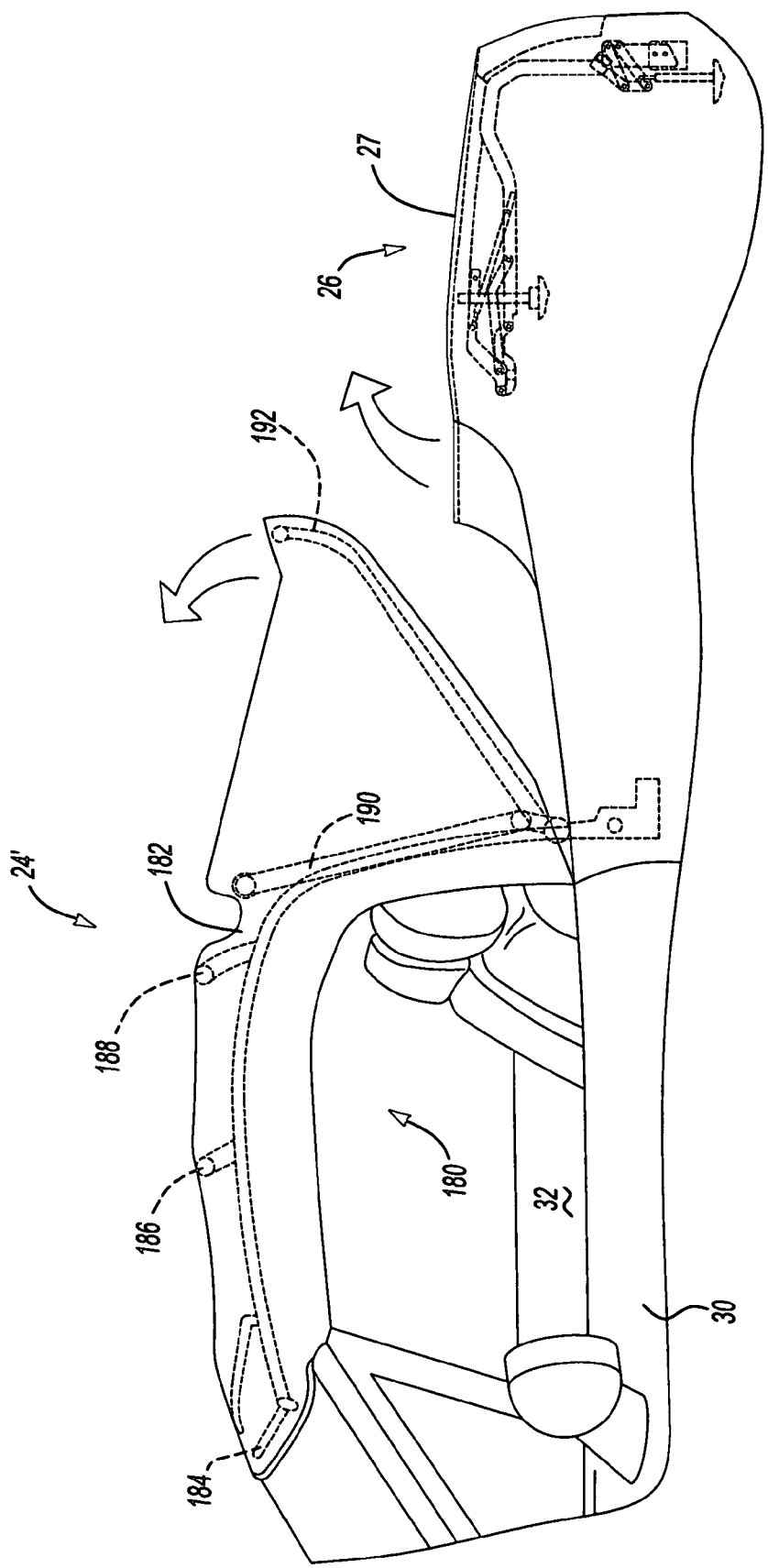

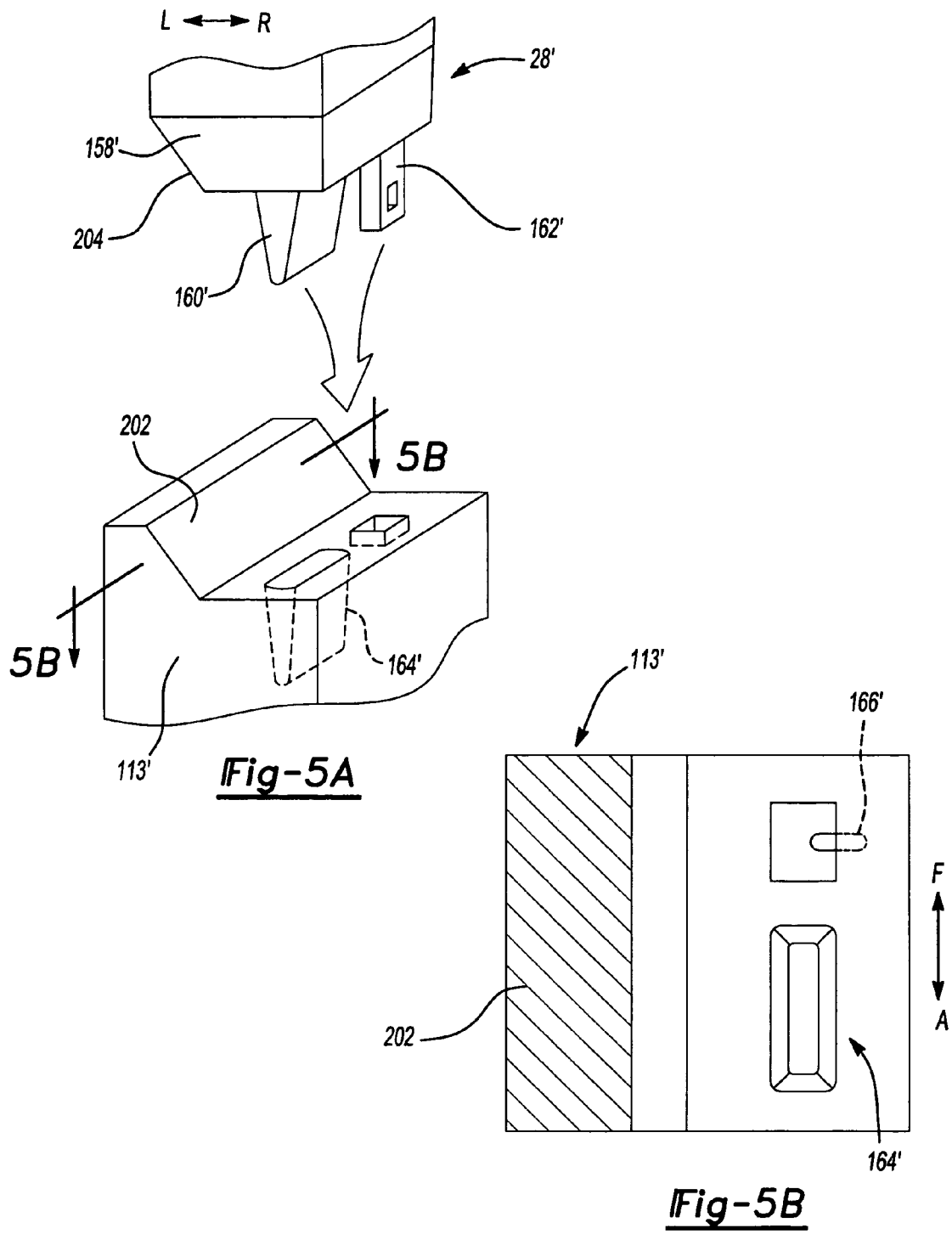

RETRACTABLE ROOF STRUCTURAL SYSTEM

CROSS-REFERENCE TO RELATED APPLICATIONS

This application claims the benefit of U.S. Provisional Application No. 60/457,045, filed on Mar. 24, 2003. The disclosure of the above application is incorporated herein by reference.

BACKGROUND AND SUMMARY OF THE INVENTION

The present invention relates generally to retractable roof vehicles, and more specifically, to retractable roof structural systems for a retractable roof vehicle. Vehicle manufacturers offering fixed roof vehicles for sale may also desire to offer a retractable roof option. These vehicles, however, may not be designed to accommodate a retractable roof system without reducing the structural rigidity or stiffness of the vehicle body. In other words, removal of the fixed roof removes a major structural element of the vehicle that enhances structural rigidity and stiffness.

To compensate for the reduced structural rigidity and stiffness when utilizing a soft-top retractable roof system on the vehicle, a fixed rear beam that extends between opposing quarter panel sections of the vehicle is employed. The fixed rear beam can be part of the boot or stowage well that is installed in the vehicle to provide a stowage space for the retractable top when in its stowed position or be independent of the stowage well. This fixed rear beam can also serve to function as a drain trough for the vehicle to capture moisture that runs downwardly along the soft-top retractable roof.

When a hard-top retractable roof system is employed on the vehicle, however, the use of a fixed rear beam that extends between opposing quarter panel sections on the vehicle may not be an option. That is, when a hard-top retractable roof system is utilized, the panels that comprise the hard-top retractable roof require a larger stowage space and retract further back in the stowage space than the roof bows and roof cover of a soft-top retractable roof. The increased space requirement for the panels of the hard-top retractable roof prevent the positioning of a fixed rear beam between the opposing quarter panel sections in a position that provides meaningful structural support to enhance the rigidity and stiffness of the vehicle. That is, because the roof panels require the large stowage space, a fixed rear beam has to be positioned further rearwardly than that used with a soft-top retractable roof. The positioning of the fixed rear beam further rearwardly reduces the contribution of the fixed rear beam to enhancing the structural rigidity and stiffness of the vehicle. To overcome this, other structural members are incorporated into the vehicle to increase the rigidity and stiffness of the vehicle. For example, the thickness of the floor pan that forms the bottom of the boot well can be increased and/or additional support members can be added below the floor pan to enhance the structural rigidity and stiffness of the vehicle. These other structural means, however, have a limited ability to meaningfully enhance the structural rigidity and stiffness of the vehicle due to their positioning in a lower portion of the vehicle.

Accordingly, it is desirable to provide a support member that is positioned in a location on the vehicle that meaningfully enhances the structural rigidity and stiffness of the vehicle without interfering with the retraction of a retractable roof. Furthermore, it is desirable for the location of the support member to remain the same regardless of the vehicle having a soft-top retractable roof system or a hard-top retractable roof system so that the enhancement of the structure rigidity and stiffness is similar for both types of retractable roofs. Moreover, it is desirable to utilize the same structural member for both a soft-top retractable roof system and a hard-top retractable roof system for the vehicle.

A retractable roof structural system according to the principles of the present invention is advantageous over traditional designs in that it provides a support member that is positioned in a location on the vehicle that meaningfully enhances the structural rigidity and stiffness of the vehicle regardless of the retractable roof being a soft-top or hard-top retractable roof. The retractable roof structural system utilizes a support member that is coupled to opposing quarter panel sections of the vehicle to provide such structural support. The support member can be selectively uncoupled from the vehicle to allow the for unimpeded retraction of the retractable roof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A is a fragmented exploded view of the structural member and retaining mechanism of the retractable roof structural system according to the principles of the present invention;

FIG. 3B is a cross-sectional view of the structural member and retaining mechanism of FIG. 4A along line B—B when the structural member and retaining mechanism are engaged with one another;

FIGS. 4A–C are fragmented side elevation views of a vehicle with a retractable roof structural system according to the principles of the present invention including a soft-top retractable roof with the retractable roof in a raised, intermediate and stowed position, respectively;

FIG. 5A is an exploded fragmented view of an alternate embodiment of the structural member and retaining mechanism of the retractable roof structural system according to the principles of the present invention;

FIG. 5B is a top view of the retaining mechanism of FIG. 5A along line B—B; and

DETAILED DESCRIPTION OF THE PREFERRED EMBODIMENT

The following description of the preferred embodiment is merely exemplary in nature and is in no way intended to limit the invention, its application, or uses.

Figure 1A:
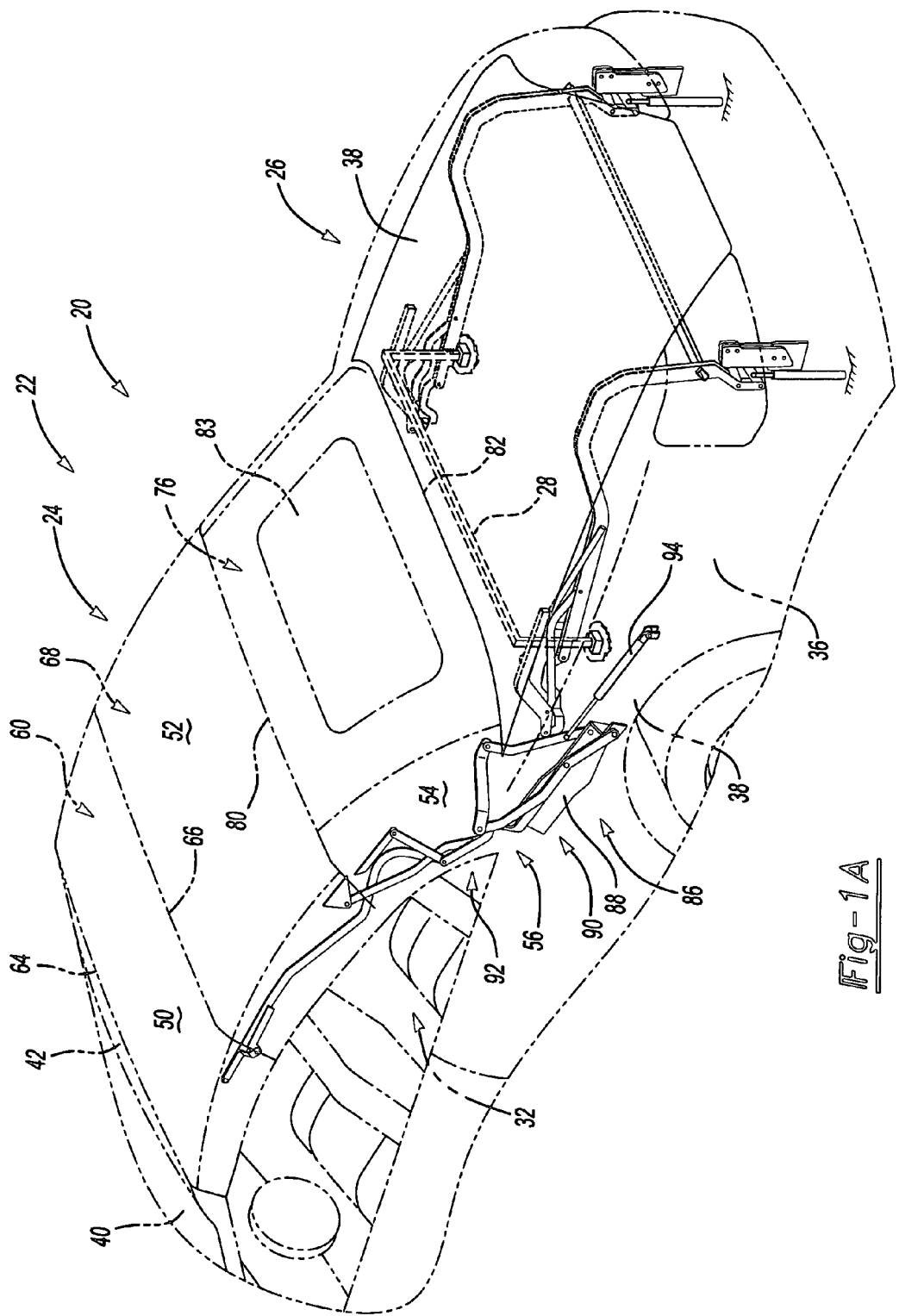
FIG. 1A is a fragmented perspective view of a vehicle with a retractable roof structural system according to the principles of the present invention including a hard-top retractable roof in the raised position.
Figure 1B:
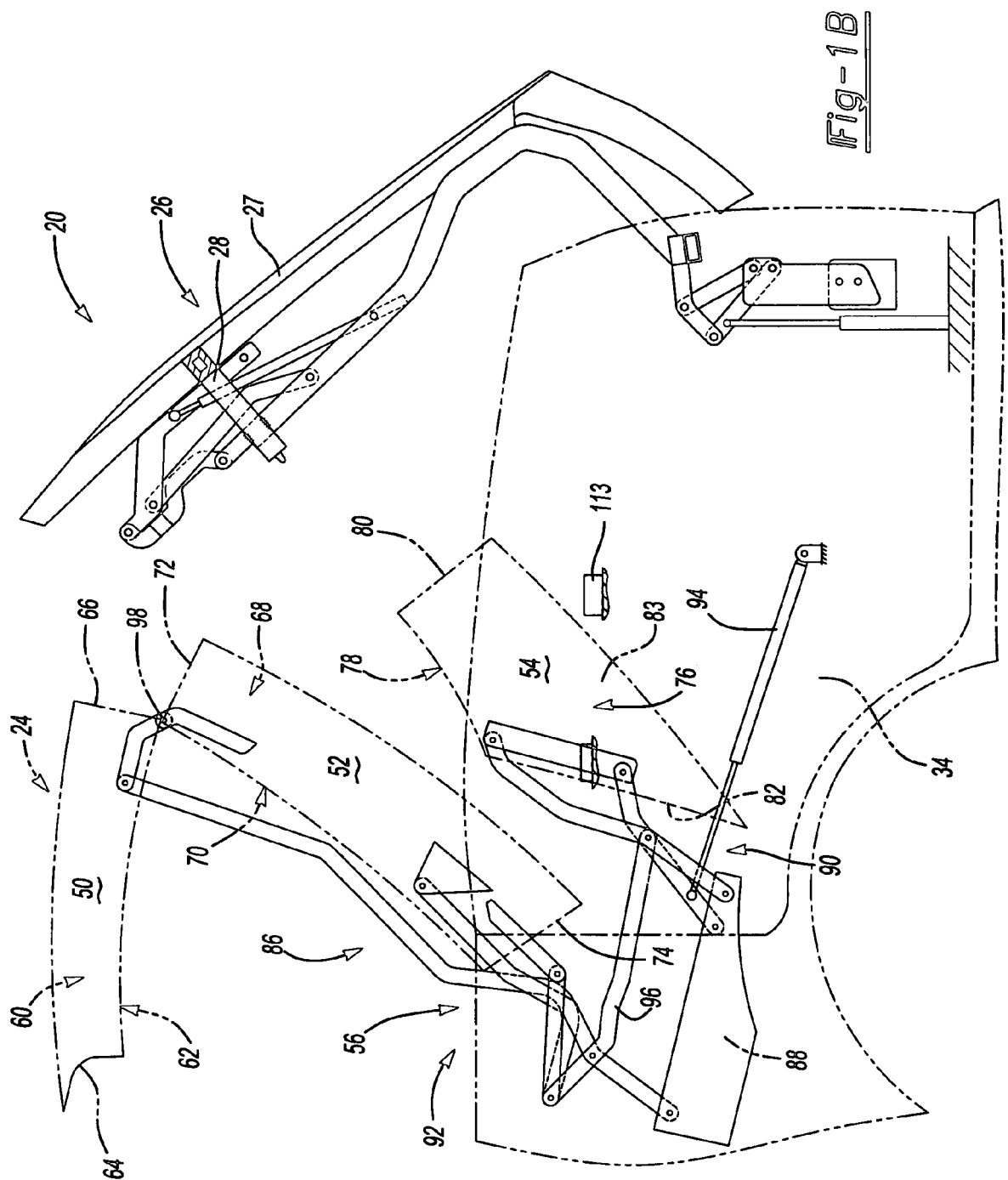
FIGS. 1B and 1C are fragmented side elevation views of the retractable roof structural system of FIG. 1A with the hard-top retractable roof in an intermediate and stowed position, respectively.
Figure 1C:
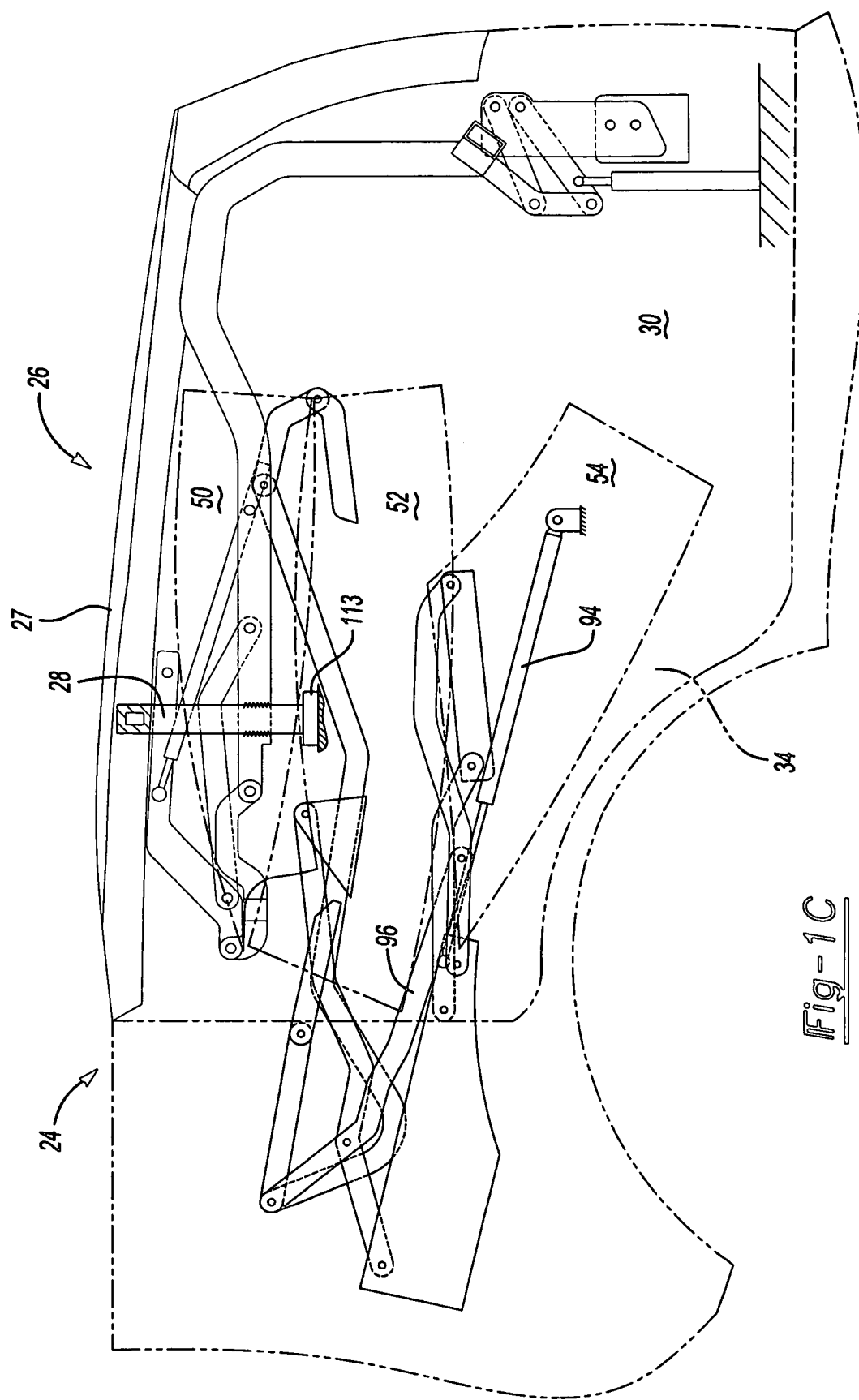

FIGS. 1A–C show an exemplary automotive vehicle 20 having a retractable roof structural system, generally indicated as 22, constructed in accordance with the teachings of the present invention. System 22 includes a retractable roof, shown as a hard-top retractable roof and generally indicated as 24, operable between a raised position (FIG. 1A), intermediate positions, such as that shown in FIG. 1B, and a stowed position (FIG. 1C). System 22 also includes a dual acting or two-way opening decklid assembly, generally indicated as 26, that is coupled to vehicle 20. Decklid assembly 26 includes a decklid panel 27 and is operable between a first or closed position (FIGS. 1A and C, 2A, and 4A–C), a second or forwardly open position (FIGS. 1B and 2B,) to allow retractable roof 24 to move between its raised and stowed positions, and a third or rearwardly open position (FIG. 2C) to allow access to a storage area from a rear of vehicle 20, as described below. Decklid assembly 26 also includes a moveable structural member 28 that extends transversely across vehicle 20. Structural member 28 is selectively coupleable to vehicle 20 to significantly enhance the torsional rigidity and stiffness of vehicle 20, as described below.

Vehicle 20 is constructed with a body 30 having a passenger compartment 32 and a stowage or storage area 34 behind passenger compartment 32 within which retractable roof 24 is located when in its stowed position. Body 30 also has opposing quarter panel sections 36 which include rear wheel housings 38 and strut towers (not shown). Wheel housings 38 and the strut towers encroach into storage area 34. Passenger compartment 32 includes a windshield 40 and a header 42. Header 42 spans transversely across the top of windshield 40.

Retractable roof 24 is similar to that disclosed in U.S. patent application Ser. No. 10/245,973 filed on Sep. 18, 2002, entitled "Vehicle Retractable Hard-top Roof" by Willard and assigned to the assignee of this Application, the disclosure of which is incorporated by reference herein. Retractable roof 24 includes a first roof section or panel 50, a second roof section or panel 52, a third roof section or panel 54 and a retraction mechanism 56. Retractable roof 24 is moveable from a raised position depicted in FIG. 1A, through intermediate positions, such as the position depicted in FIG. 1B, to a stowed position depicted in FIG. 1C. Each of the first, second and third roof sections are substantially rigid members interconnected to one another by retraction mechanism 56.

First roof section 50 has an outer surface 60, an inner surface 62, a leading edge 64, and a trailing edge 66. First roof section 50 includes a conventional latching mechanism (not shown) which is disengageably attachable with header 42 when retractable roof 24 is in the raised position. Leading edge 64 sealingly engages header 42 when the latching mechanism secures first roof section 50 to header 42.

Second roof section 52 has an outer surface 68, an inner surface 70, a leading edge 72, and a trailing edge 74. Leading edge 72 sealingly engages trailing edge 66 of first roof section 50 when retractable roof 24 is in the raised position. Third roof section 54 has an outer surface 76, an inner surface 78, a leading edge 80, and a trailing edge 82. Leading edge 80 is sealingly engaged with trailing edge 74 of second roof section 52 when retractable roof 24 is in the raised position. Trailing edge 82 includes lip seals (not shown) which sealingly engage decklid panel 27 when third roof section 54 is in the raised position. Third roof section 54 also includes includes a transparent window 83. Window 83 may be a three-dimensionally curved glass member matching the contour of the rear portion of third roof section 54 or may be a flexible translucent panel constructed from PVC or other suitable material.

Retraction mechanism 56 is mounted in a cavity of storage area 34. Retraction mechanism 56 includes a pair of actuation assemblies 86 that are mounted to fixed brackets 88 near each outboard edge of vehicle 20. Because each of actuation assemblies 86 are substantially identical mirror images of one another, only the driver's side actuation assembly will be described in greater detail.

Actuation assembly 86 includes a first linkage assembly 90 that interconnects third roof section 54 with bracket 88. A second linkage assembly 92 interconnects first and second roof sections 50, 52 together and interconnects roof sections 50, 52 with bracket 88. An actuator 94 is coupled to first linkage assembly 90 and is operable to cause retractable roof 24 to move between its raised and stowed positions, as described below. Actuator 94 is depicted as a hydraulic cylinder coupled to first linkage assembly 90. It should be appreciated, however, that actuator 94 may alternately be constructed as an electric motor, a pneumatic cylinder, or any suitable power source for driving first linkage assembly 90. Actuator 94 is coupled to vehicle 20 and positioned within the cavity of storage area 34.

First and second linkage assemblies 90 and 92 are interconnected by a control link 96 so that movement of second and third roof sections 52 and 54 between the raised and stowed positions is coordinated. First and second roof sections 50 and 52 are interconnected together adjacent their respective trailing edge 66 and leading edge 72 at pivot 98. Alternately, a hinge assembly (not shown) that may include a pair of clasps (not shown) coupled to first and second roof sections 50 and 52 that are each pivotably coupled to one another by a hinge pin (not shown) can be used. Pivot 98 coordinates the movement of first and second roof sections 50 and 52 relative to one another and causes first and second roof sections 50 and 52 to retract in a clamshell type manner, as described below. A control mechanism (not shown) capable of sensing the positions of roof sections 50, 52 and 54 and/or that of retraction mechanism 56 is used to assure that retractable roof 24 may be moved between the raised and stowed positions without causing binding or interferences between the roof sections, decklid assembly 26 and any other vehicle components. With reference to FIG. 1C, retractable roof 24 is shown in the stowed position. In the stowed position, first roof section 50 and second roof section 52 are each positioned in a substantially horizontal manner within storage area 34.

Figure 2A:
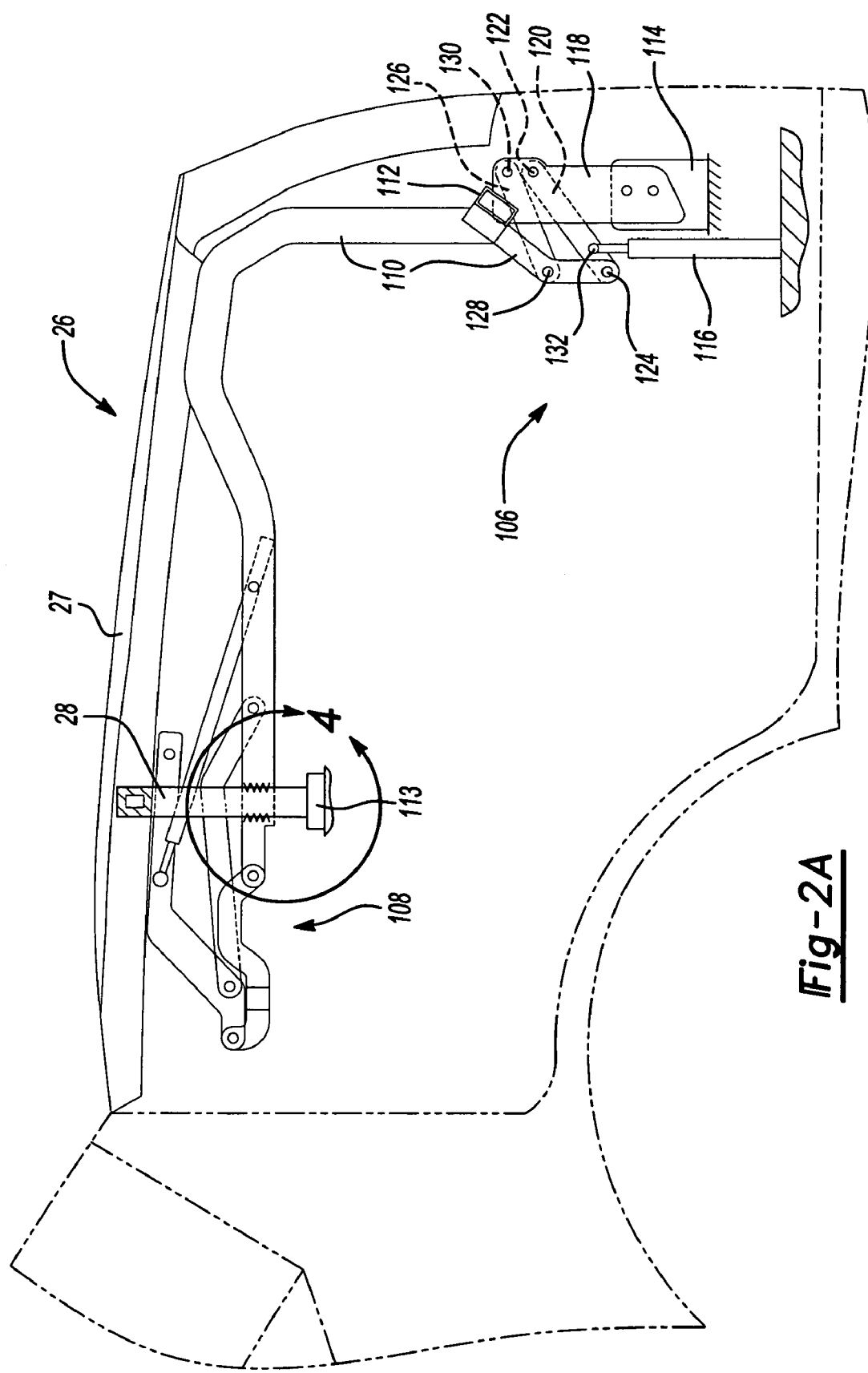
FIGS. 2A–C are fragmented side elevation views of the vehicle with the retractable roof structural system of FIGS. 1A–C with the decklid assembly in a closed, forwardly opening and rearwardly opening position, respectively.
Figure 2B:
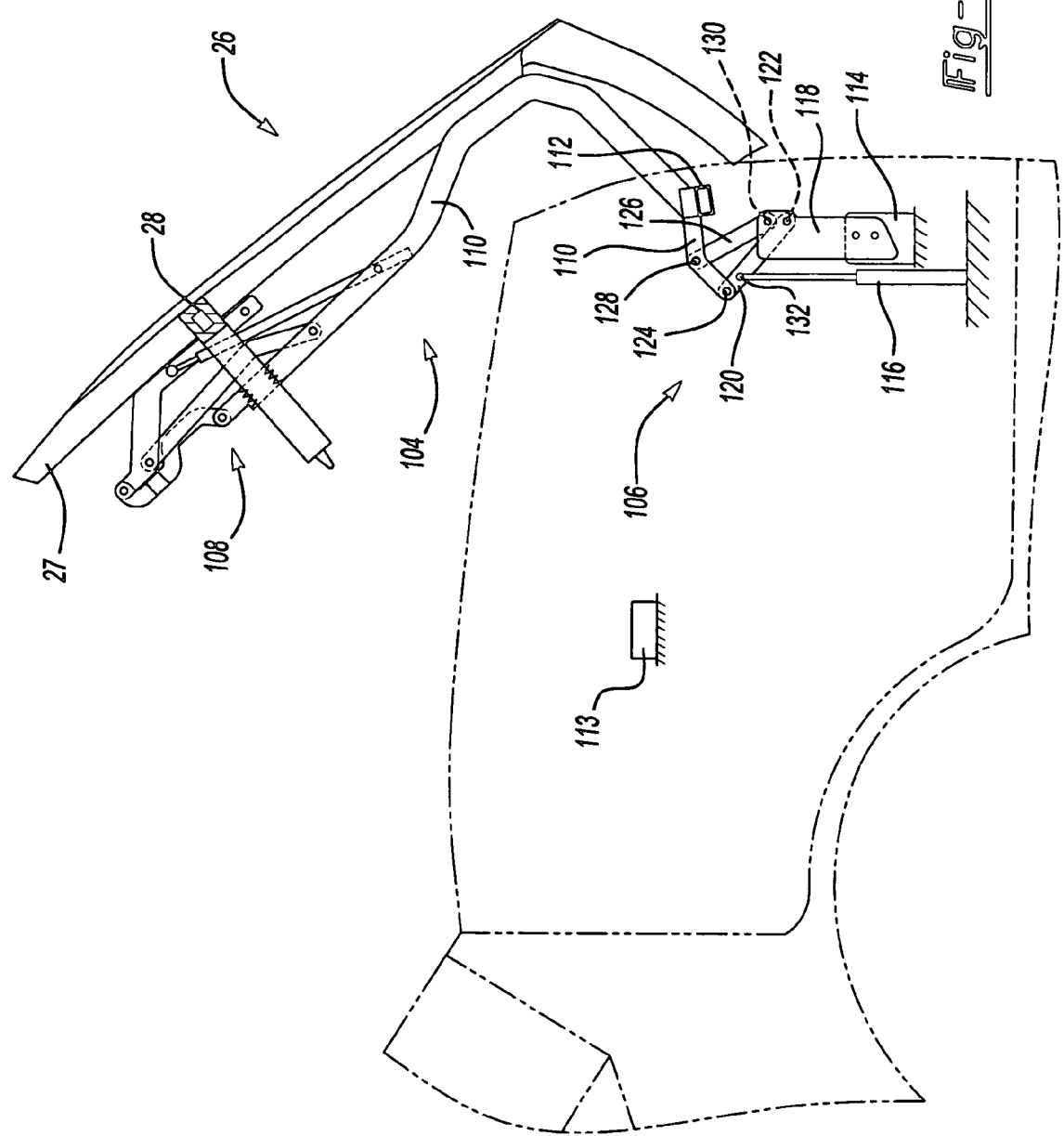
Figure 2C:
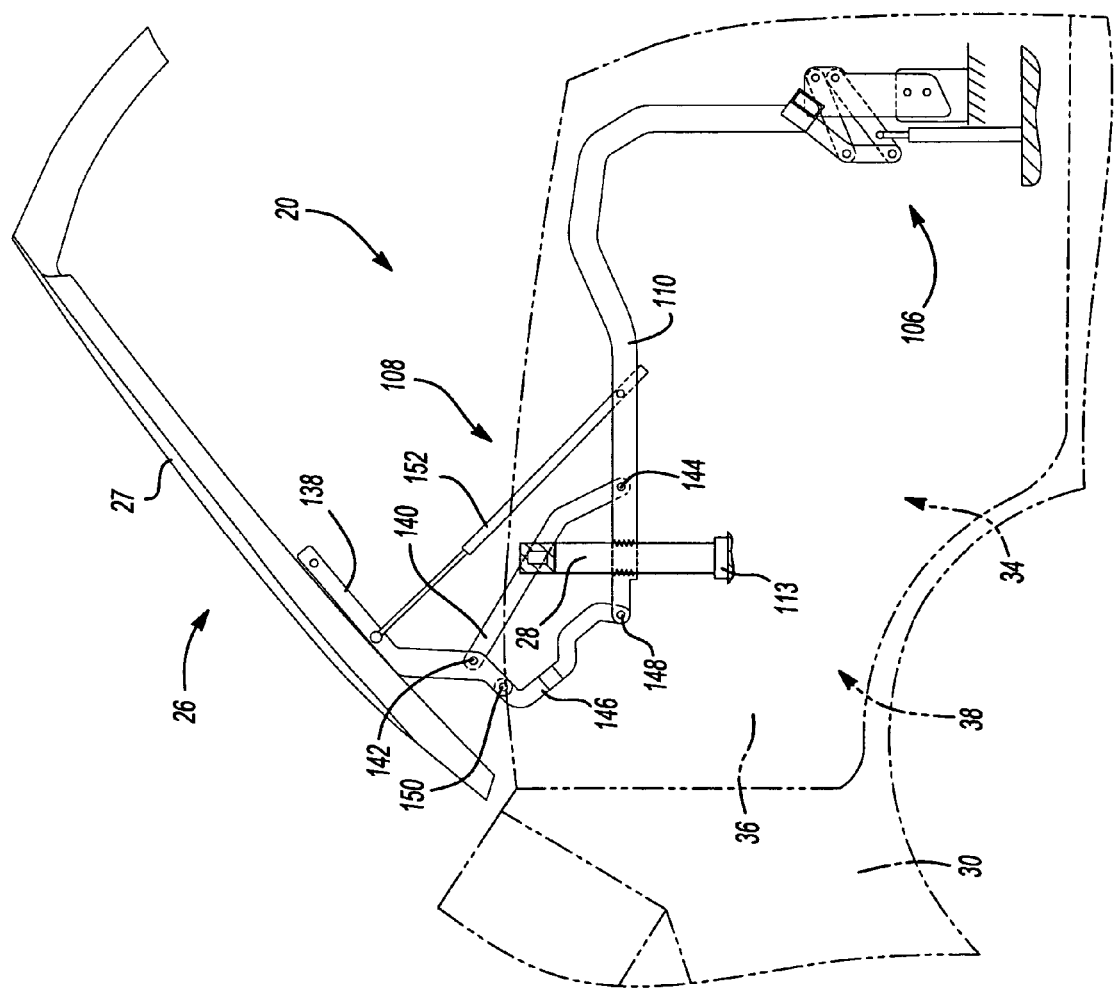

Referring now to FIGS. 2A–C, details of decklid assembly 26 are shown. Decklid assembly 26 includes a frame 104, rear linkage assemblies 106, decklid panel 27, and front linkage assemblies 108. Frame 104 includes two longitudinal members 110 along with a rear transverse member 112 and structural member 28 that space longitudinal members 110 apart and are attached to respective rear and front portions of longitudinal members 110. Structural member 28 moves with the movement of frame 104. Structural member 28 engages with retaining mechanisms 113 that are fixedly attached to vehicle 20 in storage area 34 between quarter panels 36. The engagement of structural member 28 with retaining mechanisms 113 secures structural member 28 to the body 30 of vehicle 20 to provide significant structural support and torsional rigidity to vehicle 20. The interaction between structural member 28 and retaining mechanisms 113 is described in more detail below.

A front portion of decklid panel 27 is pivotably coupled to a front portion of frame 104 by front linkage assemblies 108. Front linkage assemblies 108 allow decklid panel 27 to move between the rear open and closed positions to allow access to storage area 34 independent of movement of frame 104, as described below. Rear linkage assemblies 106 are attached to a rear portion of frame 104 and to fixed brackets 114 on vehicle 20. Rear linkage assemblies 106 are operable to cause frame 104 and decklid panel 27 to move between the forward open and the closed positions to allow retraction and extension of retractable roof 24, as described below. Powered actuators 116 are attached to a rear portion of storage area 34 and to one of the links in each rear linkage assembly 106. Powered actuators 116 are operable to move rear linkage assemblies 106 and cause frame 104 and decklid panel 27 to move between the forward open and closed positions. Powered actuators 116 can take a variety of forms. Preferably, powered actuators 116 are hydraulic cylinders that move between extended and retracted positions to operate rear linkage assemblies 106. Alternatively, powered actuators 116 can be in the form of electric motors that drives rear linkage assemblies 106.

FIGS. 2A and 2B illustrate rear linkage assembly 106 which includes a first link 118 that fixedly attaches rear linkage assembly 106 to bracket 114 of vehicle 20. First link 118 thereby is a fixed link that remains stationary regardless of movement of rear linkage assembly 106. One end of a second link 120 is pivotably attached to first link 118 at pivot 122 while the other end of second link 120 is pivotably attached to a rear portion of longitudinal member 110 of frame 104 at pivot 124. One end of a third link 126 is pivotably attached to a rear portion of longitudinal member 110 of frame 104 at pivot 128 while the other end of third link 126 is pivotably attached to first link 118 at pivot 130. Thus, rear linkage assembly 106 forms a four-bar non-scissor linkage assembly which includes first link 118, second link 120, longitudinal member 110, and third link 126 and is defined by pivots 122, 124, 128 and 130.

One end of powered actuator 116 is pivotably attached to second link 120 at pivot 132 while the other end of powered actuator 116 is attached to body 30 of vehicle 20. As shown in FIG. 2A, when powered actuator 116 is in a retracted position, frame 104 is in its closed position, decklid panel 27 covers a portion of storage area 34, and structural member 28 is engaged with retaining mechanisms 113. To move decklid panel 27 from the closed position to the forward open position, retaining mechanisms 113 are operated to release structural member 28, and powered actuator 116 is operated to move from its retracted position to its extended position, as shown in FIG. 2B. As powered actuator 116 extends, second link 120 is pushed by powered actuator 116 and causes frame 104 and decklid panel 27 to move to the forward open position. When frame 104 is in the forward open position, decklid panel 27 is no longer covering storage area 34, structural member 28 is not extending between quarter panels 36 in storage area 34 and retractable roof 24 can be operated to move between its raised and stowed positions. It is preferred that decklid panel 27 remain in its closed position when frame 104 is moved between the forward open and closed positions. Once retractable roof 24 has been moved to its raised or stowed position, powered actuator 116 is operated to retract and pull second link 120 toward powered actuator 116. The retraction of powered actuator 116 thereby causes frame 104 and decklid panel 27 to move from the forward open position to the closed position. Structural member 28 can then engage with retaining mechanisms 113 to provide significant torsional rigidity and stiffness to vehicle 20. Thus, powered actuator 116 either pushes or pulls second link 120 away from or toward powered actuator 116 to cause frame 104, decklid panel 27 and structural member 28 to move and allow access to storage area 34 so that retractable roof 24 can move between the raised and stowed positions.

Referring now to FIGS. 2A and 2C, it can be seen that front linkage assembly 108 is operable to allow decklid panel 27 to move between its closed position, as shown in FIG. 2A, and its rear open position, as shown in FIG. 2C, which allows access to storage area 34 from a rear of vehicle 20. Front linkage assembly 108 includes a first link 138 which is fixedly attached to a front portion of decklid panel 27. One end of a second link 140 is pivotably attached to first link 138 at pivot 142 while the other end of second link 140 is pivotably attached to a front portion of longitudinal member 110 of frame 104 at pivot 144. One end of a third link 146 is pivotably attached to the front portion of longitudinal member 110 at pivot 148 further forward of pivot 144 while the other end of third link 146 is pivotably attached to first link 138 at pivot 150. First link 138, second link 140, longitudinal member 110, and third link 146 thereby form a four-bar linkage assembly defined by pivots 142, 144, 148 and 150 which allows decklid panel 27 to move between the rear open and the closed positions. A biasing member 152, in this case in the form of gas strut, is attached to longitudinal member 110 and first link 138. Gas strut 152 helps retain decklid panel 27 in the rear open position. Alternatively, other biasing mechanisms can be used, such as springs, without departing from the scope of the present invention. Decklid panel 27 is capable of moving between the rear open and closed positions independently of movement of frame 104. Thus, frame 104 can remain stationary and/or in its closed position while decklid panel 27 moves between the rear open and closed positions.

Structural member 28 is fixedly attached, such as by welding, bolts or the like, to longitudinal members 110 and extends transversely through storage area 34 between quarter panel sections 36. Structural member 28 has opposite ends that are each received within retaining mechanisms 113 which are fixedly attached to opposing quarter panel sections 36 of body 30 of vehicle 20. Retaining mechanisms 113 are operable to selectively engage and disengage with structural member 28. When retaining mechanisms 113 are engaged with structural member 28, structural member 28 becomes an integral part of body 30 of vehicle 20 and provides significant structural support and torsional rigidity to body 30 between opposing quarter panel sections 36. That is, structural member 28 forms a rigid connection between opposing quarter panel sections 36 that functions to structurally reinforce and stiffen body 30 of vehicle 20 so that a desired torsional rigidity and stiffness of vehicle 20 is achieved. Typically, the resulting location will be in the upper portion of storage area 34 above the floor pan of storage area 34. This upward location within storage area 34 facilitates the enhancing of the structural rigidity and stiffness of body 30 of vehicle 20. The location of structural member 28 when secured by retaining mechanisms 113 in that area may interfere with movement of retractable roof 24 between its raised and stowed positions. To accommodate the desire to provide additional structural support and rigidity to the upper portion of storage area 34 while enabling the use of a retractable roof 24, structural member 28 moves with the movement of frame 104 of decklid assembly 26 to allow access to storage area 34 and to not interfere with the movement of retractable roof 24 between its raised and stowed positions, as described below. Structural member 28 serves essentially the same function as the fixed rear beam that is used on traditional soft-top retractable roof vehicles to enhance the structural rigidity and stiffness of the vehicle.

Referring now to FIGS. 3A and B, the preferred embodiment of structural member 28 and retaining mechanisms 113 is shown. An engagement member 158 is attached to the end of structural member 28. Engagement member 158 can be attached to the end of structural member 28 in a variety of ways. For example, engagement member 158 can be attached with welding, bolts or the like. Engagement member 158 is configured to engage with retaining mechanism 113 to secure structural member 28 to quarter panel sections 36 of vehicle 20. Engagement member 158 has a guide and force transmitting pin 160 that extends outwardly therefrom. A latching member, in this case in the form of a striker, also extends outwardly from engagement member 158. Retaining mechanism 113 has a recess 164 that is complementary to pin 160. Preferably, pin 160 is conical in shape or tapers towards its tip and recess 164 is a complementary conical or tapered recess. The complementary tapering of pin 160 and recess 164 align structural member 28 relative to retaining mechanism 113 when engaging structural member 28 with retaining mechanism 113.

Retaining mechanism 113 also has a latching member 166 that engages with striker 162 and the opening therein to secure structural member 28 to retaining mechanisms 113. In the preferred embodiment, latching member 166 is in the form of a hooked-shaped member that when struck by striker 162 moves to engage with the opening in striker 162 to secure structural member 28 to retaining mechanism 113. Latching member 166 is preferably a power pull-down latching member wherein the contact between striker 162 and latching member 166 causes latching member 166 to latch onto striker 162 and pull structural member 28 toward retaining mechanism 113 as guided by the engagement between pin 160 and recess 164. The power pull-down latching member continues to pull structure member 28 toward retaining mechanism 113 until a desired relative position is achieved. Preferably, during this period, the powered actuator 116 is controlled to be in a relaxed or non-biasing state to allow frame 104 to be pulled downwardly along with structural member 28 by the power pull-down latching member.

The engagement between pin 160 and recess 164, along with providing an alignment function, is also the force transmitting coupling between structural member 28 and quarter panel sections 36 via retaining mechanisms 113. That is, as vehicle 20 is driven the flexing and twisting of body 30 is transmitted between opposing quarter panel sections 36 through retaining mechanisms 113 and structural member 28. Accordingly, pin 160 and recess 164 are designed to accommodate the expected compression and tension to be imparted therebetween due to the operation of vehicle 20. Preferably, structural member 28, engagement member 158, and recess 164 are all made of a strong metal, such as steel or the like, to facilitate the transmitting of these forces without failing. It should be appreciated, however, that other materials capable of withstanding the expected stresses and strains can be utilized. Furthermore, striker 162 and latching member 166 are preferably designed so that the forces being transferred between opposing quarter panel sections 36 through structural member 28 do not impose significant loading on striker 162 and latching member 166.

As shown in FIGS. 2A–C, structural member 28 is rectangular in cross-sectional shape. It should be appreciated, however, that other cross-sectional shapes, such as circular, can be employed. The cross-sectional shape selected for structural member 28 will depend upon the space available and the force-transmitting characteristics for the specific shape.

Structural member 28, being a force transmitting member, is made from a strong material, such as metal. A variety of materials can be used to make structural member 28. For example, structural member 28 can be made from a standard sheet steel section that is folded and welded into the desired cross-sectional shape.

Decklid assembly 26 is preferably operated by a separate control system (not shown) capable of moving decklid assembly 26 between the rear open, closed, and forward open positions. The control system functions to coordinate movement of decklid assembly 26 with retractable roof 24 such that storage area 34 is accessible when moving retractable roof 24 between its raised and stowed positions. Alternately, decklid assembly 26 may be manually operated and selectively latched to body 30. As such, storage area 34 is selectively enclosed or accessible. The manually operated decklid assembly 26 includes a biasing mechanism, such as a spring (not shown), for urging decklid assembly 26 toward the forward open position.

In operation, retractable roof 24 is moved from the raised position depicted in FIG. 1A through intermediate positions such as the one depicted in FIG. 1B, to the stowed position depicted in FIG. 1C by first unlatching first roof section 50 from header 42. An operator engages a switch (not shown) located in passenger compartment 32. The switch is connected electrically to actuator 94 to control the operation of retractable roof 24. When retractable roof 24 is used in conjunction with a manually operated decklid, a simple switch may be implemented without the need for sophisticated electronic controls, proximity switches and/or sensors. However, the retractable roof of the present invention may be operated in conjunction with a power operated decklid as previously discussed. In this case, the switch is connected electrically to an electronic control unit (not shown) such as a microprocessor, that controls the operation of retractable roof 24. The electronic control unit sends a signal to operate actuator 94, retaining mechanisms 113 and actuators 116 coupled to decklid assembly 26. Devices such as limit switches, sensors and/or potentiometers are coupled to body 30, decklid assembly 26 and retractable roof 24 to inform the electronic control unit of the position of decklid assembly 26 and retractable roof 24 to assure that retractable roof 24 and decklid assembly 26 do not interfere with one another during movement between the stowed and raised positions. An example of a suitable control system for retractable roof 24 and/or decklid assembly 26 is that disclosed in U.S. Pat. No. 6,288,511 entitled "Automotive Convertible Top System" issued to Porter et al., the disclosure of which is incorporated by reference herein.

When the operator engages the switch to operate retractable roof 24, the control system causes retaining mechanisms 113 to disengage from or release structural member 28 and decklid panel 27 to move from its closed position to its forward open position to allow access to storage area 34 for the movement of retractable roof 24. As decklid panel 27 and frame 104 move from the closed position to the forward open position, structural member 28 disengages from retaining mechanisms 113. The disengagement of structural member 28 from retaining mechanisms 113 uncouples structural member 28 from opposing quarter panel sections 36 of body 30 of vehicle 20. With structural member 28 disengaged from retaining mechanisms 113, structural member 28 travels with frame 104 and decklid panel 27 to the forward open position, as shown in FIG. 1B.

Actuator 94 is pivotably coupled to and powered to drive first linkage assembly 90 to move retractable roof 24 between the raised and stowed positions. As first linkage assembly 90 articulates, force is transferred through control link 96 to second linkage assembly 92 and to first and second roof sections 50, 52. The force produced is sufficient to cause first, second and third roof sections 50, 52, and 54 to move. As depicted in FIG. 1B, first roof section 50 pivots relative to second roof section 52 in a clamshell manner such that inner surface 62 of first roof section 50 approaches inner surface 70 of second roof section 52. Thus, when moving from the raised to the stowed position, second roof section 52 rotates rearwardly, first roof section 50 rotates counterclockwise (in the view depicted) relative to second roof section 52, and third roof section 54 rotates rearwardly. Once retractable roof 24 is fully retracted, frame 104 and decklid panel 27 can be moved to the closed position, as shown in FIG. 1C.

As decklid assembly 26 moves from the forward open position to the closed position structural member 28 engages with retaining mechanisms 113 and effectively couples opposing quarter panel sections 36 to structural member 28. This coupling enables loads to be transferred between opposing quarter panel sections 36 via structural member 28 which functions to increase the torsional rigidity and stiffness of body 30 of vehicle 20. Structural member 28 is configured so that when structural member 28 is engaged with retaining mechanisms 113 and retractable roof 24 is in the stowed position, structural member 28 does not contact outer surface 60 of first roof section 50. In other words, structural member 28 is configured so that retractable roof 24, when in the stowed position, does not interfere with the engagement of structural member 28 with retaining mechanisms 113. As such, structural member 28 can take a variety of shapes and configurations depending on the shape and configuration of retractable roof 24, storage area 34 and the locations of retaining mechanisms 113. For example, structural member 28 can be generally U-shaped so that the end portions extend downwardly and engage with retaining mechanisms 113 while an intermediate portion extends over outer surface 60 of first roof section 50 when retractable roof 24 is in the stowed position. Structural member 28 could also be substantially straight and extend directly across storage area 34, if the configuration of retractable roof 24 so allowed.

Retractable roof structural system 22, according to the principles of the present invention, can also be utilized with a soft-top retractable roof, such as that discussed below. System 22 when used with a soft-top retractable roof enables structural member 28 to be positioned more forwardly in storage area 34 than is possible with the fixed rear beam that is used with a traditional soft-top retractable roof. That is, structural member 28 can be positioned more forwardly in the vehicle such that structural member 28 extends between opposing quarter panel sections 36 beneath the rearmost roof bow of the soft-top retractable roof without interfering with the retraction of the retractable roof due to structural member 28 moving with decklid assembly 26 to allow access to storage area 34 when retracting the retractable roof. Thus, system 22 provides more flexibility in the positioning of a structural member to enhance the torsional rigidity and stiffness of a vehicle on which a soft-top retractable roof is employed.

System 22 when used with a soft-top retractable roof, also enables the use of a bootwell that is not required to provide structural enhancement to the rigidity or stiffness of vehicle 20. That is, vehicle 20 can utilize system 22 and, specifically, structural member 28 to provide the desired enhancement to the torsional rigidity and stiffness of vehicle 20 between opposing quarter panel sections 36 while the bootwell serves to provide the desired stowage space for the retractable roof and drain water through appropriate troughs. With this functionality, the bootwell can be economically manufactured from a plastic material instead of the expensive sheet metal or steel that is currently used.

Figure 4C:
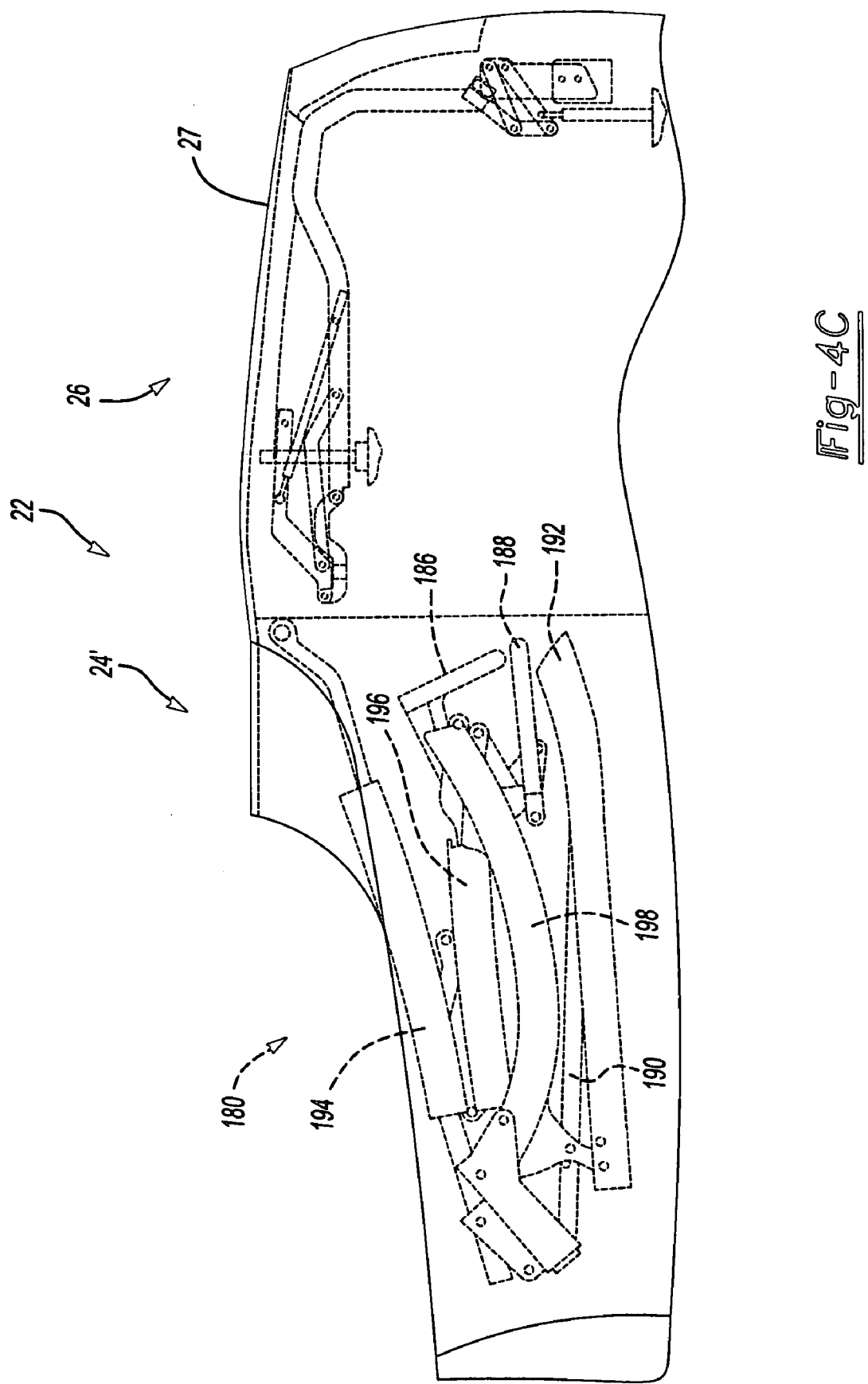

Referring now to FIGS. 4A–C, retractable roof structural system 22 is shown on vehicle 20 having a soft-top retractable roof 24'. Soft-top retractable roof 24' includes a linkage assembly or top stack mechanism 180 covered by a pliable fabric top covering 182. More specifically, the linkage assembly includes a number one or forwardmost roof bow 184, a number two roof bow 186, a number three roof bow 188, a number four roof bow 190, and a number five or rearmost roof bow 192. The top stack mechanism 180 also includes a front roof rail 194, a center roof rail 196, and a rear roof rail 198 (shown in FIG. 4C).

As can be seen in FIG. 4C, front roof rail 194 is pivotably coupled to center roof rail 196 and is controlled by a linkage assembly. Center roof rail 196 is pivotably coupled to rear roof rail 198 and is controlled by a different linkage assembly. Soft-top retractable roof 24' is operable to move between a raised or extended position covering passenger compartment 32, as shown in FIG. 4A, through intermediate positions, such as that shown in FIG. 4B, to a fully retracted or stowed position within storage area 34, as shown in FIG. 4C. An actuator (not shown), such as a hydraulic cylinder, is coupled to top stack mechanism 180 to move retractable roof 24' between its raised and stowed positions. It should be appreciated that the type of actuator used can vary and can include a hydraulic cylinder, an electric motor, a pneumatic cylinder, or any other suitable power source for driving top stack mechanism 180. Preferably, the actuator used is the same type of actuator that is used with decklid assembly 26. Alternatively, retractable roof 24' can be manually operated to move between the raised and stowed positions.

In operation, when it is desired to move retractable roof 24' from the raised position to the stowed position, number five roof bow 192 is rotated upwardly and forwardly, as shown in FIG. 4B, an amount sufficient to allow frame 104 of decklid assembly 26 to be moved from the closed to the forward open position. Once number five roof bow 192 has moved a sufficient distance, decklid assembly 26 is operated to cause frame 104 to move from the closed to the forward open position to allow access to storage area 34. Soft-top retractable roof 24' is then retracted into storage area 34, as shown in FIG. 4C. As can be seen, the roof rails 194, 196 and 198 rotate relative to one another and are stacked on top of one another when in the stowed position. Decklid assembly 26 is then operated to cause frame 104 to move to the closed position thereby causing decklid panel 27 to cover at least a portion of soft-top retractable roof 24'. While soft-top retractable roof 24' is disclosed as being an automatically operated soft-top retractable roof, it should be appreciated that movement of soft-top retractable roof 24' between its extended and stowed positions can be done manually without the use of powered actuators.

It should be appreciated that system 22 according to the principles of the present invention enables storage area 34 of vehicle 20 to be designed to be universally configured to accept either a hard-top retractable roof or a soft-top retractable roof, regardless of the existence of a decklid that extends beneath the soft-top retractable roof. That is, not all soft-top retractable roofs have a roof bow that extends over the exterior surface of a decklid such that a structural member that is positioned beneath the decklid must be removed so that the soft-top retractable roof can be retracted. With system 22 of the present invention the location of structural member 28 can be chosen to provide a desired enhancement of the torsional rigidity and stiffness of vehicle 20. This same location can be utilized for both a soft-top retractable roof and a hard-top retractable roof. When using a soft-top retractable roof, this location can be utilized as the rear lip or drain trough of the bootwell that is installed in storage area 34. Thus, the rear lip of the bootwell can be coupled to the opposing quarter panel sections 36 at this desired location without interfering with the operation of the soft-top retractable roof. The same location can then be used for a hard-top retractable roof. This is accomplished by positioning structural member 28 beneath decklid panel 27 in a position that corresponds to the desired location of coupling opposing quarter panel sections 36. Because structural member 28 is selectively coupled to opposing quarter panel sections 36, structural member 28 can be moved with the operation of decklid assembly 26, as discussed above, to not interfere with the operation of the hard-top retractable roof between its raised and stowed positions. This functionality enables vehicle 20 using the retractable roof structural system of the present invention to be converted to either a soft-top or hard-top retractable roof that utilizes a structural member 28 that couples to opposing quarter panel sections 36 at the same or common location regardless of the type of retractable roof utilized. System 22 also enables a vehicle 20, when it is being designed, to select a preferred location for coupling of opposing quarter panel sections 36 together with a structural member regardless of the type of retractable roof that will be employed. This functionality can reduce the design costs for vehicle 20 while providing similar performance characteristics for vehicle 20 regardless of the use of a soft-top or hard-top retractable roof.

Referring now to FIGS. 5A and B, a first alternate embodiment of structural member 28 of system 22 is shown. In this embodiment, retaining mechanisms 113' have a sloped surface 202 that engages with a complementary sloped surface 204 on engagement members 158' of structural member 28'. The sloped surfaces 202, 204 engage with one another as frame 104 moves to its closed position. Engagement between sloped surfaces 202, 204 pushes on structural member 28' and aligns structural member 28' with retaining mechanisms 113' in the cross-car direction. Guide pins 160' and recesses 164' can then be designed to provide fore and aft alignment of structural member 28' with retaining mechanisms 113'. Strikers 162' engage with latching members 166' to pull structural member 28' into secure engagement with retaining mechanisms 113'. Guide pins 160' and recesses 164' allow force to be transmitted between opposing quarter panels 36 through structural member 28' to enhance the torsional rigidity and stiffness of vehicle 20.

Figure 6:
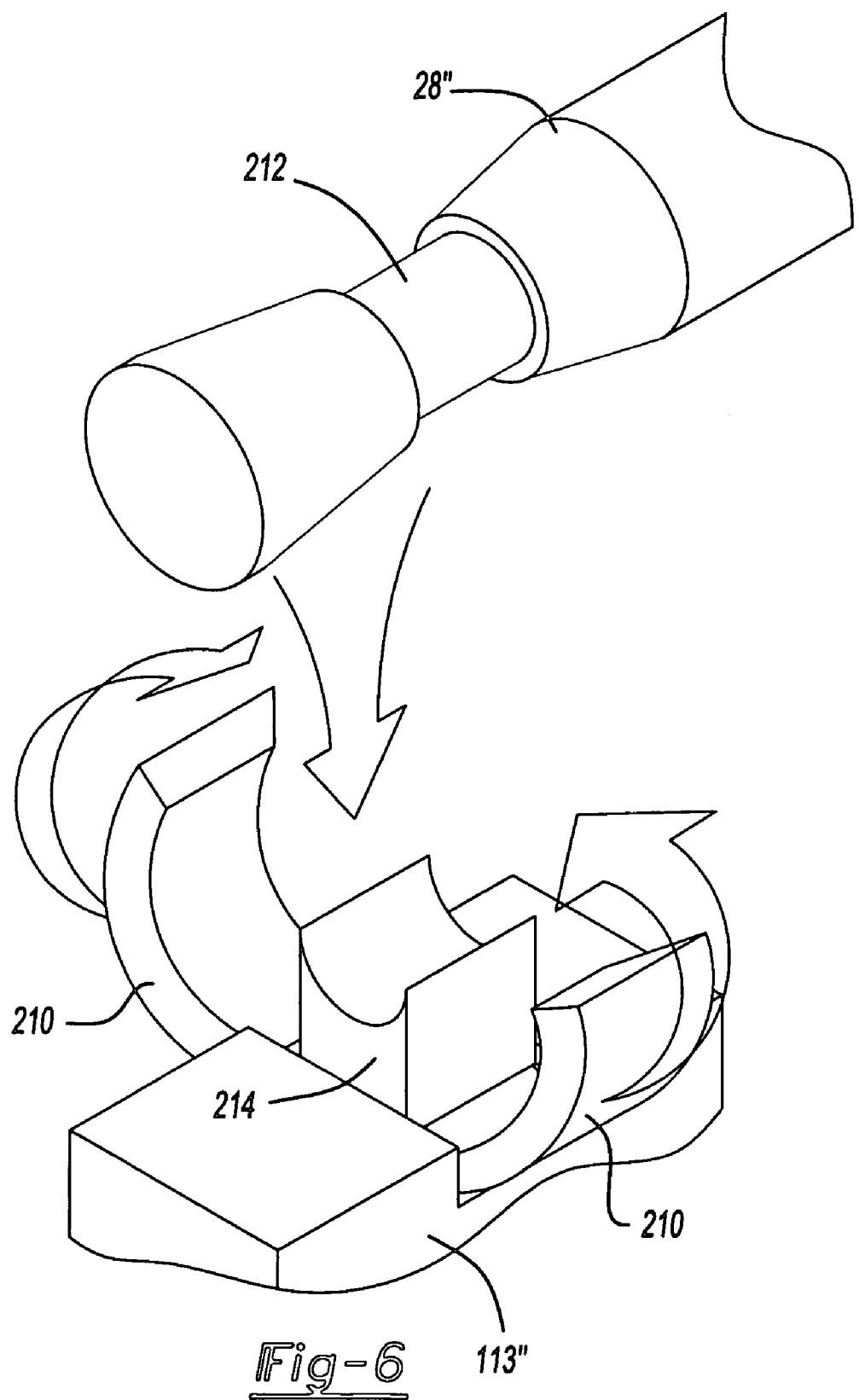
FIG. 6 is an exploded fragmented perspective view of a second alternate embodiment of the structural member and retaining mechanism of the retractable roof structural system according to the principles of the present invention.

In yet another alternate embodiment, as shown in FIG. 6, retaining mechanisms 113" include a clamping member 210 that engages with an annular recess 212 on the ends of structural member 28" to selectively secure structural member 28" to opposing quarter panels of vehicle 20. Clamping members 210 preferably have a tapered surface that is complementary to a tapered surface on annular recesses 212 to facilitate the alignment of an engagement between retaining mechanisms 113" and structural member 28". Retaining mechanisms 113" also have a support 214 that is complementary to annular recesses 212 and upon which annular recesses 212 of structural member 28' are positioned when secured to retaining mechanisms 113". In this embodiment, force is transferred between the opposing quarter panels through structural member 28" via the engagement between annular recesses 212 and supports 214 of retaining mechanisms 113". Clamping member 210 is operable to selectively engage and disengage with structural member 28" to allow frame 104 and decklid panel 27 to move between the closed and forward open positions.

It should be appreciated that while system 22 is shown as including specific retractable roofs 24, 24', other retractable roofs can be employed without departing from the spirit and scope of the invention. Additionally, system 22 can be utilized with an outfolding convertible roof such as that disclosed in U.S. Pat. No. 4,828,317 entitled "Convertible Top Frame with Quarter Windows" by Muscat, the disclosure of which is incorporated by reference herein. Furthermore, system 22 can also be used with different types of decklid assemblies both power operated and manually operated. Additionally, structural member 28 may be attached to decklid panel 27 in addition to or instead of frame 104, if desired.

Thus, it should be appreciated that retractable roof structural system 22 according to the principles of the present invention provides many advantages and features for a vehicle 20 that heretofore have not been available. System 22 allows the placement of structural member 28 in a location on vehicle 20 that provides meaningful enhancement of the torsional rigidity and stiffness of vehicle 20. Such a location is achieved by the ability of structural member 28 to be moved, in conjunction with decklid assembly 26, out of storage area 34 to provide unimpeded access to storage area 34 for the movement of a retractable roof between its raised and stowed positions. System 22 enables such enhancement of the torsional rigidity and stiffness of vehicle 20 regardless of the use of a hard-top or soft-top retractable roof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A retractable roof structural system for a vehicle body having quarter panel sections, the system comprising:

a retractable roof operable between raised and stowed positions;

a retraction mechanism operable to move said retractable roof between said raised and stowed positions;

a decklid operable between first and second positions, said decklid allowing movement of said retractable roof between said raised and stowed positions when said decklid is in said second position, and said decklid covering at least a portion of said retractable roof when in said stowed position when said decklid is in said first position; and a structural member operable to provide structural support to and increase a stiffness of a vehicle body on which said retractable roof is utilized, said structural member being configured to be selectively coupled adjacent the opposing quarter panel sections, and said structural member is uncoupled when said retractable roof is moving between said raised and stowed positions, and said structural member extends across the vehicle in a cross-vehicle direction below a belt line of the vehicle and adjacent to at least one of a strut tower and a rear wheel housing when coupled.

2. The system of claim 1, wherein said structural member is attached to said decklid and moves with said decklid between said first and second positions.

3. The system of claim 1, wherein said retractable roof is a hard-top retractable roof.

4. The system of claim 1, wherein said retractable roof is a soft-top retractable roof.

5. The system of claim 1, wherein said structural member is attached to a frame of said decklid.

6. The system of claim 1, further comprising a retaining mechanism attached to said vehicle body between said opposing quarter panel sections, said retaining mechanism being operable to selectively couple said structural member to said vehicle body.

7. An automotive vehicle comprising:
 a retractable roof operable between raised and stowed positions; and
 a moveable structural member operable to selectively provide structural support and rigidity to a vehicle body on which said retractable roof is utilized, said structural member selectively coupled to said vehicle body between adjacent body panel structures of said vehicle body and extending in a cross-vehicle orientation, a majority of a cross-vehicle extending portion of said structural member, when coupled, being above a fore-and-aft middle section of said retractable roof when in said stowed position, and said structural member being uncoupled from said vehicle body when said retractable roof is moving between said raised and stowed positions.

8. The vehicle of claim 7, further comprising a decklid operable between first and second positions, said decklid when in said first position covering at least a portion of said retractable roof when in said stowed position, and said decklid allowing movement of said retractable roof between said raised and stowed positions when said decklid is in said second position.

9. The vehicle of claim 8, wherein said structural member is coupled to said vehicle body when said decklid is in said first position and is uncoupled from said vehicle body when said decklid is in said second position.

10. The vehicle of claim 9, wherein said structural member is coupled to said decklid and moves with said decklid between said first and second positions.

11. The vehicle of claim 10, wherein said structural member is attached to a frame of said decklid.

12. The vehicle of claim 7, wherein said retractable roof is a hard-top retractable roof.

13. The vehicle of claim 7, wherein said retractable roof is a soft-top retractable roof.

14. The vehicle of claim 7, further comprising a retaining mechanism attached to said vehicle body between said adjacent body panel structures, said retaining mechanism being operable to selectively couple said structural member to said vehicle body.

15. The vehicle of claim 7, further comprising a retraction mechanism operable to move said retractable roof between said raised and stowed positions.

16. A decklid system for an automotive vehicle, the decklid system comprising:
 a storage compartment covering panel configured to cover a portion of an automotive vehicle;
 a panel mechanism operable to move said panel between a first position covering said portion of said automotive vehicle and a second position allowing accesses to said covered portion, said panel mechanism including a frame that supports said panel; and
 a structural member attached to said frame and operable to selectively provide structural support and rigidity to a body of said vehicle, said structural member extending in a cross-vehicle orientation, being engaged with said body of said vehicle, and providing said support when said panel is in said first position, and said structural member being disengaged from said body of said vehicle when said panel is in said second position.

17. The decklid system of claim 16, further comprising a retaining mechanism on said body of said vehicle and wherein said structural member selectively engages with said retaining mechanism to provide said structural support to said body of said vehicle.

18. The decklid system of claim 17, wherein said retaining mechanism includes a latching member operable to latch said structural member to said retaining mechanism.

19. The decklid system of claim 18, wherein said latching member is a power pull down latching member operable to automatically latch said structural member to said retaining mechanism.

20. The decklid system of claim 17, wherein said retaining mechanism has a sloped surface that aligns said structural member with said retaining mechanism.

21. The decklid system of claim 20, wherein said structural member has a sloped surface that is complementary to said sloped surface of said retaining mechanism and said sloped surfaces align said structural member with said retaining mechanism.

22. The decklid system of claim 17, wherein said retaining mechanism has a clamping member that selectively clamps said structural member to said retaining mechanism.

23. The decklid system of claim 17, further comprising a pin member operable to align said structural member with said retaining mechanism.

24. The decklid system of claim 16, wherein said structural member is attached to said panel.

25. The decklid system of claim 16, wherein said panel is a two way opening panel, said panel mechanism is operable to move said panel to a third position to allow access to said covered portion of said vehicle, and access to said covered portion of said vehicle when said panel is in said second and third positions being from different directions.

26. The decklid system of claim 16, wherein said structural member extends in a cross-vehicle orientation between opposing body panel structures of said body of said vehicle when providing said support.

27. A method of manufacturing a universal stowage area in an automotive vehicle for stowing a convertible roof and providing substantially an equivalent torsional rigidity to the stowage area regardless of the convertible roof being a soft-top or hard-top convertible roof, the method comprising:
 (a) positioning retaining mechanisms in the stowage area of the automotive vehicle;
 (b) attaching a moveable structural member operable to engage with said retaining mechanisms to provide structural support and torsional rigidity to the storage area and installing a second mechanism in the stowage area that is operable to move said structural member between a first position enabling said structural member to engage with said retaining mechanisms and a second position disengaged from said retaining mechanism and allowing clearance for raising and stowing a convertible roof;

(c) selectively securing said structural member to the stowage area of the vehicle with said retaining mechanisms and with said structural member extending in a cross-vehicle orientation in an upper half of the stowage area; and (d) securing a decklid panel to said second mechanism that moves with said structural member between said first and second positions, wherein said second mechanism is coupled to a frame, said structural member is coupled to said frame, said decklid panel is coupled to and supported by said frame and said second mechanism is operable to move said frame, said structural member and said decklid panel between said first and second positions.

28. The method of claim 27, further comprising installing a hard-top convertible roof system in the vehicle.

29. The method of claim 27, further comprising installing a soft-top convertible roof system in the vehicle.

30. A method of moving a retractable roof between a raised position covering a portion of a passenger compartment of a vehicle and a stowed position in a storage area of the vehicle, the method comprising:

(a) disengaging a structural member that extends in a cross-vehicle orientation across a front half of the storage area from a retaining mechanism in said front half of the storage area, said structural member being coupled to a moveable frame supporting a panel operable to cover at least a portion of the storage area, and moving said structural member from a first position providing structural support and rigidity to the storage area to a second non-interfering position that allows movement of the retractable roof between the raised and stowed positions;

(b) moving the retractable roof between the raised and stowed positions; and (c) moving said structural member from said second position to said first position, and engaging said structural member with said retaining mechanism and covering at least a portion of the storage area with said panel.

31. The method of claim 30, wherein (c) includes securing said structural member to said retaining mechanism with a latch.

32. The method of claim 31, wherein (c) includes securing said structural member to said retaining mechanism with a power pull down latch.

33. The method of claim 30, wherein (c) includes securing said structural member to said retaining mechanism with a clamp.

34. A method of moving a retractable roof between a raised position covering a portion of a passenger compartment of a vehicle and a stowed position in a storage area of the vehicle, the method comprising:

(a) disengaging a structural member that extends in a cross-vehicle orientation across a front half of the storage area from a retaining mechanism in said front half of the storage area and moving said structural member from a first position providing structural support and rigidity to the storage area to a second non-interfering position that allows movement of the retractable roof between the raised and stowed positions;

(b) moving the retractable roof between the raised and stowed positions; and (c) moving said structural member from said second position to said first position, aligning said structural member with said retaining mechanism with a pin and engaging said structural member with said retaining mechanism.

35. The method of claim 30, wherein (c) includes moving said structural member along a sloped surface of said retaining mechanism to align said structural member with said retaining mechanism.

36. The method of claim 30, wherein (a) includes moving a decklid panel from a first position covering a portion of the storage area to a second non-interfering position that allows movement of the retractable roof between the raised and stowed positions and (c) includes moving said decklid panel from said second position to said first position.

37. The method of claim 36, wherein (a) and (c) include moving said structural member and said decklid panel in unison.

38. A movable structural system for a vehicle body having a storage area, the system comprising:

a cover member operable between first and second positions to selectively cover at least a portion of the storage area;

a pair of retaining mechanisms in said storage area;

a structural support member operable between engaged and disengaged positions with said retaining mechanisms and moving with said cover member in at least one operable position, said structural support member having a cross-vehicle portion that extends across the storage area in a cross-vehicle orientation when in said engaged position, said structural support member having a pair of downwardly extending portions that extend from said cross-vehicle portion and engage with said retaining mechanisms when in said engaged position to provide structural support to and increase a torsional rigidity of a vehicle body, said downwardly extending portions being substantially vertically oriented when in said engaged position; and a frame upon which said cover member is coupled, movement of said frame between said first and second positions causing said cover member to move between said first and second positions and wherein said support member is attached to said frame with said downwardly extending portions of said structural support member extending downwardly beyond said frame.

39. The system of claim 38, further comprising a retractable roof operable between raised and stowed positions and said cover member, when in said first position, covers at least a portion of said retractable roof when in said stowed position.

40. A storage compartment cover latching system comprising:

a movable cover member operable between first and second positions to selectively cover at least a portion of the storage compartment;

a latching member coupled to said moveable cover, said latching member having a recessed portion with sloping sidewalls; and a latching mechanism operable to selectively engage with said latching member and retain said cover member in said first position, said latching mechanism including a pair of opposing moveable clamping members that move toward one another and are operable to selectively encircle said recessed portion of said latching member and retain said cover member in said first position.

41. The system of claim 1, wherein said retractable roof is below the belt line of the vehicle when in said stowed position.

42. A method of manufacturing a universal stowage area in an automotive vehicle for stowing a convertible roof and providing substantially an equivalent torsional rigidity to the stowage area regardless of the convertible roof being a soft-top or hard-top convertible roof, the method comprising:
- (a) positioning retaining mechanisms in the stowage area of the automotive vehicle;
- (b) attaching a moveable structural member operable to engage with said retaining mechanisms to provide structural support and torsional rigidity to the storage area and installing a second mechanism in the stowage area that is operable to move said structural member between a first position enabling said structural member to engage with said retaining mechanisms and a second position disengaged from said retaining mechanism and allowing clearance for raising and stowing a convertible roof;
- (c) selectively securing said structural member to the stowage area of the vehicle with said retaining mechanisms and with said structural member extending in a cross-vehicle orientation in an upper half of the stowage area; and
- (d) securing a decklid panel to said second mechanism that moves with said structural member between said first and second positions, wherein securing said decklid panel includes securing a dual-acting decklid panel that can selectively move between said second position and a third position independently of said structural member to selectively allow access to said stowage area.

43. The method of claim 30, wherein (a) and (c) include moving said frame and panel with movement of said structural member.

44. A movable structural system for a vehicle body having a storage area, the system comprising:

- a cover member operable between first and second positions to selectively cover at least a portion of the storage area;
- a pair of retaining mechanisms in said storage area; and
- a structural support member operable between engaged and disengaged positions with said retaining mechanisms and moving with said cover member in at least one operable position, said structural support member having a cross-vehicle portion that extends across the storage area in a cross-vehicle orientation when in said engaged position, said structural support member having a pair of downwardly extending portions that extend from said cross-vehicle portion and engage with said retaining mechanisms when in said engaged position to provide structural support to and increase a torsional rigidity of a vehicle body, said downwardly extending portions being substantially vertically oriented when in said engaged position, wherein said cover is moveable to a third position to selectively allow access to the storage area from two opposing directions.

* * * * *